United States Patent [19]

Ohmura et al.

[11] Patent Number: 4,664,575
[45] Date of Patent: May 12, 1987

[54] WORKPIECE TRANSFERRING APPARATUS FOR A ROBOT

[75] Inventors: Kazumi Ohmura, Minoo; Yasuyuki Suyama, Uji; Hiroaki Nagasawa, Nagaokakyou, all of Japan

[73] Assignee: Tsubakimoto Chain Co., Osaka, Japan

[21] Appl. No.: 757,621

[22] Filed: Jul. 22, 1985

[30] Foreign Application Priority Data

Jul. 31, 1984 [JP] Japan .................. 59-158984

[51] Int. Cl.$^4$ .................. B23Q 7/04; B65G 59/02
[52] U.S. Cl. .................. 414/32; 198/346.2; 269/50; 269/63; 414/100; 414/118; 414/223; 901/7
[58] Field of Search .................. 269/47, 50, 52, 63; 414/27, 32, 98, 100, 118, 223; 198/345, 346.2; 901/6, 7

[56] References Cited

U.S. PATENT DOCUMENTS

| | | | |
|---|---|---|---|
| 3,791,537 | 2/1974 | Conklin | 414/100 X |
| 4,189,133 | 2/1980 | Arrasmith et al. | 414/100 X |
| 4,196,511 | 4/1980 | Kolosov et al. | 414/32 X |
| 4,264,254 | 4/1981 | Chang | 414/27 |

FOREIGN PATENT DOCUMENTS

| | | | |
|---|---|---|---|
| 58-10481 | 1/1983 | Japan | 414/118 |
| 4378/1983 | 1/1983 | Japan . | |

*Primary Examiner*—Robert J. Spar
*Assistant Examiner*—Janice Krizek
*Attorney, Agent, or Firm*—Howson & Howson

[57] ABSTRACT

Workpieces to be machined are stacked on all but one of a series of uniformly spaced vertical guide bars on a turntable movable along a transfer path. An elevator mechanism moves into engagement with the turntable and lifts a carrier with a stack of workpieces to be machined on one of the guide bars so that the uppermost workpiece is in a position to be grasped and transferred to a machine tool by a robot arm. The elevator also positions a workpiece carrier on an adjacent guide bar so that the carrier is positioned for the stacking of machined workpieces thereon by the robot arm. The workpiece carriers are positioned by the elevators in response to signals from photoelectric detectors. When all of the workpieces on one carrier are machined and stacked on an adjacent carrier and said one carrier is unloaded, the elevator mechanism is temporarily separated from the turntable and the turntable is rotated by the distance of twice the spacing between adjacent guide bars. The elevator mechanism is reengaged with the turntable, and workpieces from a third guide bar are transferred to the machine tool and then to the unloaded guide bar. The operation is repeated until all of the workpieces on all of the guide bars are machined and transferred.

5 Claims, 3 Drawing Figures

WORKPIECE TRANSFERRING APPARATUS FOR A ROBOT

BRIEF SUMMARY OF THE INVENTION

The present invention relates to a workpiece transferring apparatus for a robot, which operates jointly with a robot for supplying workpieces to a machine tool such as a lathe and taking out machined workpieces therefrom. The invention relates to a workpiece transferring apparatus particularly adapted for use when the workpieces to be machined are relatively small, when machining time is relatively short, e.g. 15 to 30 seconds, and when it is desirable to stack as many workpieces on a workpiece feeder as is feasible.

An example of an apparatus in which workpieces are taken out and stacked at a prescribed point on a workpiece feeder is disclosed in Japanese Laid-Open Application No. 4378/1983. These apparatuses comprise a feeder dividing mechanism and a lifting mechanism which operate separately. The lifting mechanism descends to its lowest point each time a workpiece is handled, then rises to the level of the top of the stacked workpieces. This is a source of problems with the conventional apparatus in that the control thereof is complicated and in that the operation thereof involves excessive and time-consuming movement. It is also difficult to fit a workpiece guide on a pallet, and thus workpieces are stacked without a guide. Vibrations or abrupt impact which occur when the workpieces are transferred or grasped, move the workpieces out of alignment. The irregular positions of the workpieces make the stacks unstable and likely to topple.

The principal object of the present invention is to avoid the above-described faults in the operations and control of transfer mechanisms in the prior art, and to prevent the misalignment of workpieces in a reliable manner.

The invention comprises a workpiece transferring apparatus by which workpieces are transferred to and from a robot above a prescribed position in a transfer path on a workpice feeder. The workpiece transferring apparatus is provided with vertical guide bars which are uniformly spaced (i.e. arranged at equal pitches) on the transfer path. Each guide bar has a workpiece carrier supported on it so that it can be guided and elevated together with workpieces piled thereon. Two sets of elevator devices are provided. These elevator devices are guided and moved in parallel with the transfer path and engage and separate from the workpiece feeder simultaneously in such a manner that they can move with the feeder. Engagement members are provided which cause the elevator devices to engage with and support a pair of adjacent workpiece carriers so that these carriers can be elevated when the elevator devices engage them. Two sets of detectors sense that the height of the stack of unfinished workpieces on one workpiece carrier in a pair has reached a prescribed level or that the other workpiece carrier in the pair, which receives machined workpieces has reached its prescribed level. An elevation controlling device causes the elevator devices to elevate corresponding workpiece carriers at a prescribed position until each detector produces an output signal. A sequence controller causes the workpiece feeder to move forward and backward by one pitch when the robot operates from above said prescribed position to grasp one unfinished workpiece from one of two adjacent workpiece carriers in a pair and put another machined workpiece on the other of said carriers, while these carriers occupy said prescribed position alternately. The controller also causes the elevator devices to separate from the workpiece feeder when one workpiece carrier is cleared of workpieces, and then causes the workpiece feeder to move backward by twice the pitch distance so that the cleared carrier and the next carrier holding a stack of unfinished workpieces constitute a new pair of carriers which are alternately moved to the prescribed locations for stacking and unstacking of workpieces.

Ordinarily, operation is started in the state in which one workpiece carrier has no workpieces on it while each of the other workpiece carriers is loaded with a prescribed number of workpieces. When a workpiece carrier immediately ahead of the unloaded workpiece carrier is present at the prescribed position, the elevator devices engage the workpiece feeder in such a manner that they can move together with the feeder. Engagement members of the elevator devices engage the two workpiece carriers, and the height of each workpiece carrier is adjusted automatically according to a signal from a detector so that the top of the uppermost unfinished workpiece is brought to a prescribed height and the top of the unloaded workpiece carrier is lower by the height of one machined workpiece than said prescribed height.

At this time, the robot grasps the uppermost of the workpieces to be machined which are stacked at the prescribed position. The robot removes the uppermost workpiece from a guide bar with one of two grasping fingers, and moves it toward a machine tool. After the workpiece has been removed, the elevator device raises the stacked workpieces by a distance equal to the height of one unfinished workpiece, while the workpiece feeder moves forward one pitch to transfer the unloaded workpiece carrier to the prescribed position. Meanwhile, the robot removes a machined workpiece from the machine tool with its other grasping finger, charges the machine tool with the workpiece to be machined, and then returns to a position above said prescribed position, descends to place the machined workpiece onto the unloaded workpiece carrier, and then rises. Thereafter the elevator device lowers the workpiece carrier at the prescribed position by the height of one machined workpiece. In this way, the workpiece to be machined is removed from one carrier, subjected to machining, and placed on an adjacent carrier.

While the workpieces on the front workpiece carrier of a pair are being repeatedly transferred onto the rear workpiece carrier of the pair by the operations which have just been described, the two sets of elevator devices move forward and backward with the workpiece feeder. The elevator devices raise and lower the workpiece carriers so that the tops of the stacked workpieces to be machined and the tops of the machined workpieces are maintained at prescribed heights in response to the operation of the respective detectors. Thus, the amount of movement and the time required for one elevation of each elevator device are reduced to a minimum.

After all workpieces to be machined on one workpiece carrier have been transferred onto the next adjacent workpiece carrier as described above, the elevator devices separate from the workpiece feeder. The feeder then moves backward by two pitches to move to the prescribed position another workpiece carrier loaded with stacked workpieces to be machined.

Thereafter the above-described operations are repeated to machine all workpieces stacked on the workpiece feeder.

DETAILED DESCRIPTION

Figure 1:
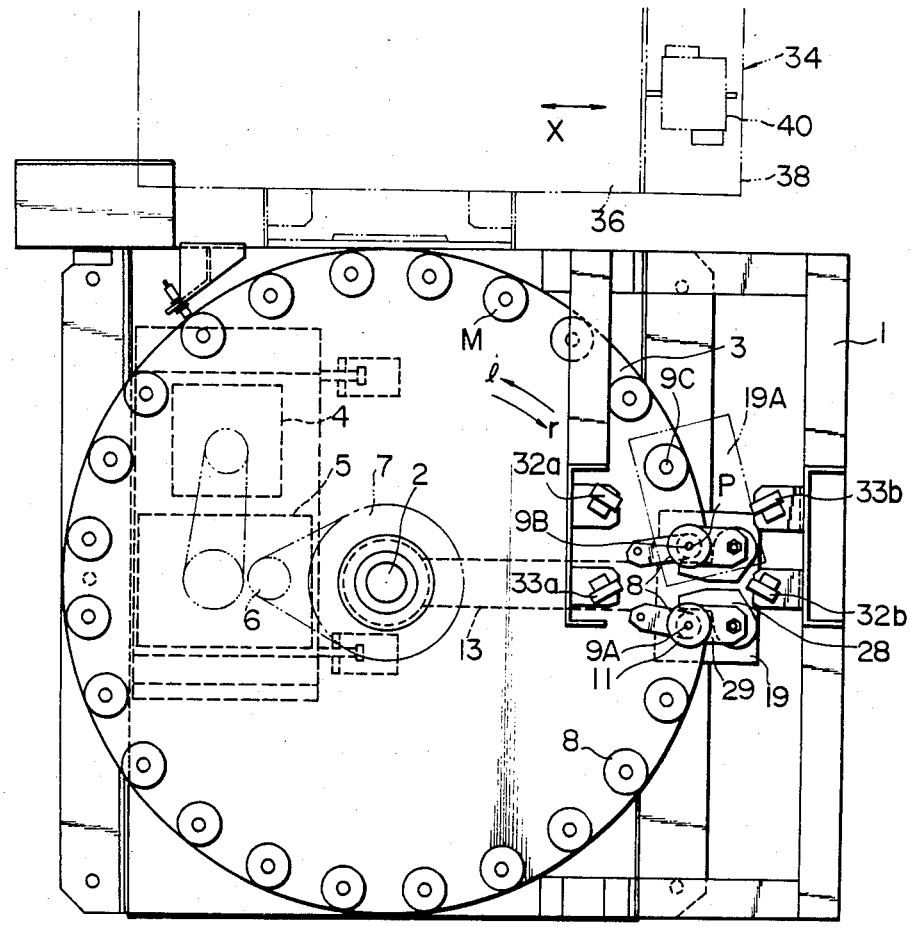
FIG. 1 is a top plan view thereof of one embodiment of the invention.

In the embodiment to be described, a turntable workpiece feeder is employed, and workpieces are stacked on workpiece carriers, with center holes of the workpieces fitted on guide bars on the carriers. The workpieces are machined by a lathe.

A turntable 3 is fixed, above a frame 1, to a vertical rotary shaft 2 borne axially by frame 1. The shaft is rotatably driven by motor 4 through a speed reduction gear 5 and sprocket wheels 6 and 7. A number of cylindrical engagement pieces 8 are fixed at equal pitches on the turntable 3 along the outer edge of the top side thereof. The base of a vertical guide bar 9 is fixed at the center of each engagement piece 8. A workpiece carrier 11 having a flange 10, a bushing 12, and a center hole, is closely fitted on each vertical guide bar so that it can be elevated on its guide bar 9 by an elevation device.

A base board 13 is supported by rotary shaft 2 through a bearing 14 and upper and lower fittings 15. The outer end portion of the base board is supported movably by a roller 16 and a rail 17. A base plate 20 carrying two sets of elevator devices 19, is pivoted tiltably on bracket 18 which is fixed to base board 13. The pivot is located at a radial distance from the axis of shaft 2 greater than the radius of turntable 3. The pivot allows radial outward tilting of base plate 20 and the elevator device 19 thereon. Fluid actuator 21 is provided for tilting the elevator devices.

The two sets of elevator devices 19 include a pair of screw shafts 23 supported axially in parallel inside a case 22 fixed to base plate 20. A pair of elevation rods 25 are guided and elevated in parallel with the screw shafts 23 through a pair of guide tubes 24 fixed to the top of the case 22. Nuts 27 are threaded onto the screw shafts 23, and elevation rods 25 are secured to the nuts through connecting rods 26. The paired elevation rods 25 are spaced from each other by the pitch of the guide bar 9, and are tiltable together between a vertical engagement position indicated by a solid line in FIG. 2, and an oblique separation position indicated by a chain line in the same figure. A pair of engagement-separation elements 28 are fixed to the upper ends of the guide tubes 24 and a pair of forked engagement members 29 are fixed to the upper ends of elevation rods 25. In the vertical engagement position, the paired engagement-separation elements 28 engage the cylindrical engagement pieces 8, thereby causing rotation of the base board 13 and its elevator devices 19 together with the turntable 3. Engagement members 29 engage the flanges 10 of the workpiece carrier 11, elevating and lowering the workpiece carriers with workpieces stacked thereon. The screw shafts 23 are rotated separately by motors 30 so as to lift the workpiece carrier 11 independently.

When the elevation rods 25 are present at the vertical engagement position, the turntable 3 rotates forward and backward through an angle corresponding to the pitch of the guide bars 9. The forward and backward rotation of the turntable takes place in conjunction with the operation of a robot for transferring workpieces, which will be described later. At the same time, the elevator devices 19 are reciprocated between the solid-line position and the chain-line position 19A in FIG. 1 due to the engagement of the engagement-separation elements 28 with cylindrical engagement pieces 8 (FIG. 2). Thus, the adjacent pair of guide bars 9A and 9B seen in FIG. 1 stop at prescribed position P alternately. The prescribed position P is the position at which workpieces are transferred between the fingers of robot 34 (FIGS. 1 and 3) and guide bar 9.

Around the prescribed position P, two light projectors 32a and 33a and two light-receiving elements 32b and 33b form two photoelectric height detectors 32 and 33. The light projectors and detectors are supported on frame 1. Detector 32 stops elevation rod 25 when it senses that the top surface of workpieces to be machined, which are stacked on a guide bar 9, have risen to a prescribed height. Detector 33 stops the elevation rod 25 when it detects that either the top surface of machined workpieces stacked by a guide bar 9 or the top of an unloaded workpiece carrier 11 has come down to a height lower, by the height of one machined workpiece, than the height of said top surface of the workpieces to be machined.

Figure 3:
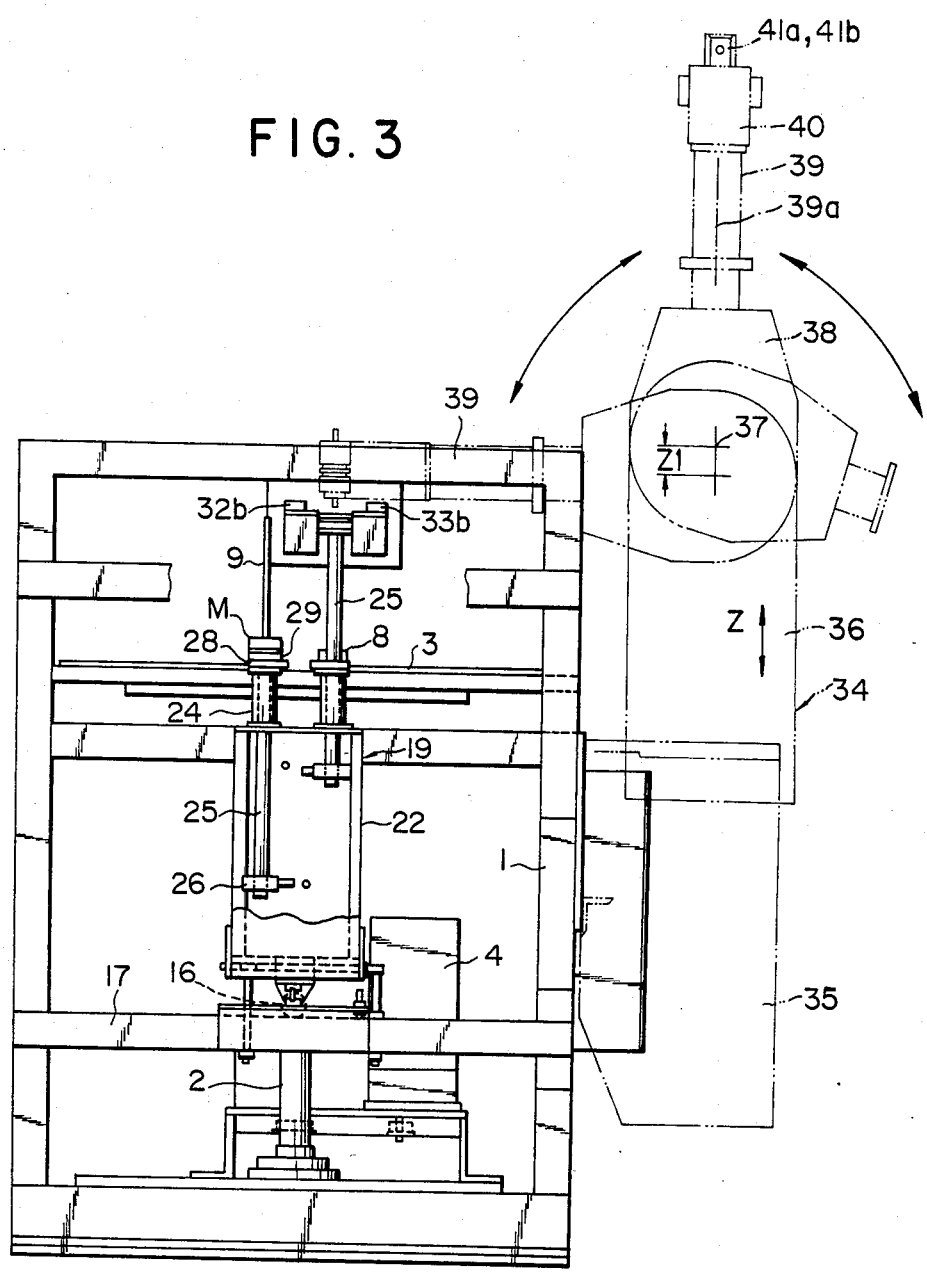
FIG. 3 is a side view thereof.

The operation of transferring workpieces will now be described. In FIG. 3, the robot 34 is equipped with a Z-axis elevation mechanism 36 mounted on a base block 35 which is fixed to and supported by frame 1. The base end of robot arm 38 is fixed to a horizontal rotating shaft 37 provided in the elevation mechanism 36. Arm 38 is provided with a wrist 39 and a hand 40. The hand 40 has two sets of fingers 41a and 41b. The wrist 39 can perform indexed rotation through an angle at least 180 degrees around the cental axis 39a thereof. When arm 38 rotates, toward turntable 3, to a horizontal position one or the other of fingers 41a and 41b comes to a position just above the prescribed position P. The robot 34 is constructed so that the arm 38 moves horizontally in the direction of the horizontal rotating shaft 37 (i.e. along the X-axis as seen in FIG. 1) for the purpose of charging workpieces into and removing workpieces from the lathe or other machine tool served by the feeder and robot.

Figure 2:
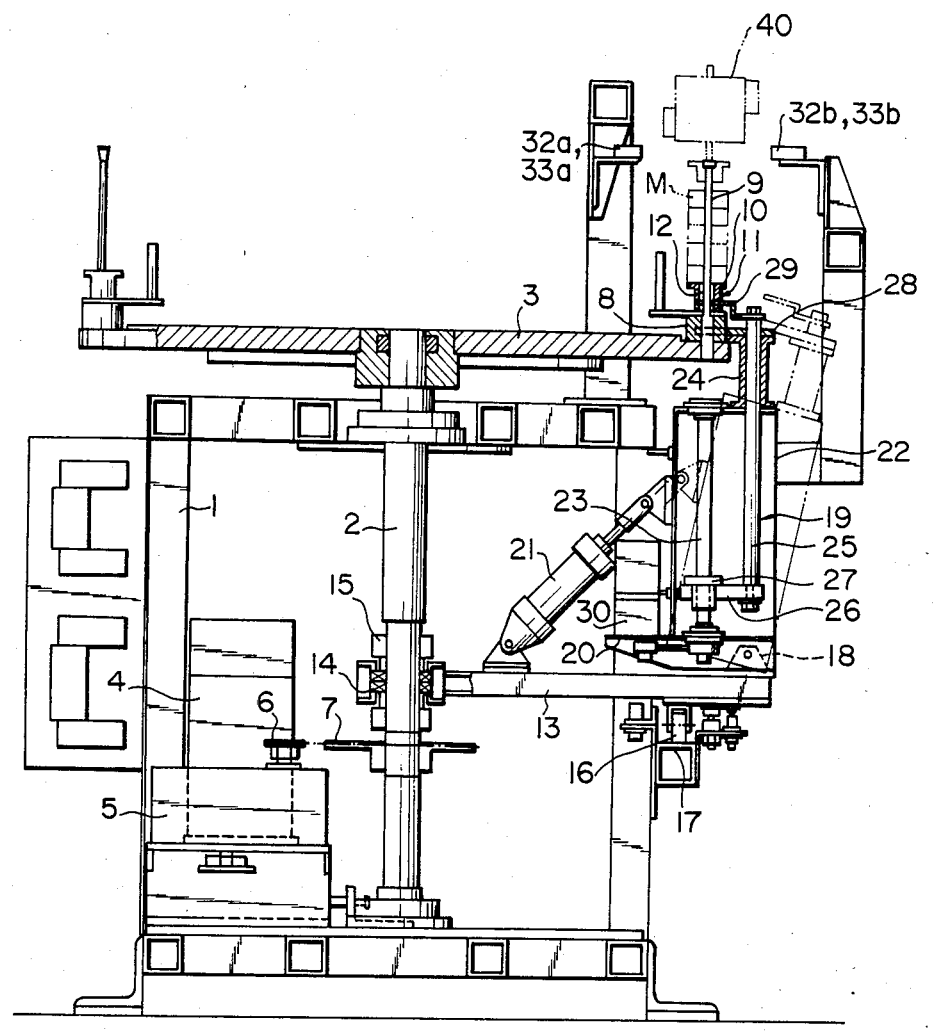
FIG. 2 is an elevation showing a section of the principal parts thereof.

Assume that initially guide bar 9B of turntable 3 shown in FIG. 1 is at the prescribed position P, and that there are no workpieces stacked on guide bar 9A. Assume also that a prescribed number of stacked workpieces M are stacked on each of the other guide bars 9; that a chuck of a machine tool for receiving workpieces from robot 34 is holding one workpiece M; and that elevation rods 25 are at their lowermost positions.

When the device starts to operate, the elevator devices 19 are moved from their tilted position into engagement with the turntable, the engagement-separation elements engage the engagement pieces 8 at the positions of guide bars 9A and 9B as shown in FIG. 1. The engagement members 29 also engage the workpiece carrier 11. Simultaneously, one screw shaft 23 rotates to raise the loaded carrier on guide bar 9B to the height at which the top surface of the uppermost of the workpieces M to be machined stacked on guide bars 9B is detected by detector 32. The other screw shaft rotates to raise the unloaded carrier on guide bar 9A.

Next, robot arm 38 moves to a position just above the prescribed position P. Then, the wrist 39 executes indexed rotation so that finger 41a is positioned on the lower side of the robot arm. The robot's elevation mechanism 36 is lowered for distance $Z_1$ (FIG. 3) to grasp one workpiece M, then is raised through distance $Z_1$, with finger 41a holding the workpiece. Thereafter arm 38 reverses its motion to transfer the workpiece to the chuck of the machine tool.

After the uppermost workpiece on guide bar 9B has been removed by the robot arm, the workpieces stacked on the guide bar 9B are raised by elevation rod 25 to the height at which detector 32 operates, i.e. by the height of one workpiece. The device then waits for another workpiece to be grasped.

Next, the turntable 3 rotates forward (in the direction of an arrow l) by one pitch so that guide bar 9A comes to the prescribed position P. The elevator devices 19, 20 being now engaged with the turntable, move along with the turntable. The carrier 11 on guide bar 9A is lowered by its elevator until a signal is produced by detector 33 indicating that the carrier has reached the proper position to receive a machined workpiece. Robot arm 38 moves again to the position just above the prescribed position P, this time with its finger 41b holding a machined workpiece removed from the chuck of the machine tool. The machined workpiece held by finger 41b is brought to a position such that it can slide onto guide bar 9A by indexed rotation of the wrist 39 which takes place while arm 38 moves about the axis of shaft 37. Then, the robot elevation mechanism 36 is lowered through a distance $Z_1$ to place the machined workpiece on the workpiece carrier 11. The robot then rises again, while its wrist 39 rotates to a position at which finger 41a can take up the next workpiece to be machined. Simultaneously, the elevation rod 25, at guide bar 9A, moves down until detector 33 produces a signal, that is, it moves down by the height of one machined workpiece. Subsequently turntable 3 reverses and rotates through one pitch in the direction of arrow r.

The operations just described are repeated, once for each workpiece in the stack, so that the workpieces stacked on guide bar 9B are machined sequentially and stacked on guide bar 9A. When guide bar 9B is cleared of stacked workpieces the elevator devices 19 tilt to separate from the turntable 3. The turntable then rotates by two pitches in the direction of arrow r, and guide bar 9B, now cleared of workpieces is moved to the position occupied theretofore by guide bar 9A, and a third guide bar 9C moves to prescribed position P. All workpieces stacked on guide bars 9 are machined in the same way as described above.

The present invention operates in the same way as described above even when the chuck of the machine tool tolds no workpiece at the beginning of operation.

While a turntable is employed as a workpiece feeder in the above embodiment, any other workpiece feeder having a transfer path of any other shape, such as a linear or oval transfer path, can be employed with the present invention, if guide bars are arranged at a fixed pitch along the transfer path and the workpiece feeder is able to move forward and backward precisely by the amount of the pitch. It is a simple matter to enable the base board of the elevator devices 19 to move together with any other workpiece feeder. Appropriate structures other than the engagement-separation elements 28 can be employed for the engagement-separation structure of the workpiece feeder and the elevator devices.

Sequences and elevation control, and control of the movement of the workpiece feeder and of the elevator device and other mechanisms of the invention, can be accomplished by known automatic controllers, which need not be described.

The present invention has the effect that, when workpieces to be machined, which are stacked at a prescribed pitch along a transfer path on a workpiece feeder, and machined workpieces are transferred to and from a robot, the feeder is moved in a manner such that transfer can be conducted at a prescribed position on the feeder. Workpieces transferred to and from the robot are sequentially raised or lowered by the height of one workpiece by the elevator devices so that they can be maintained at a prescribed height suitable for operation of the robot. Therefore, the elevator devices operate efficiently; operating time is held to a minimum; and workpieces can be handled smoothly and rapidly, especially when large numbers of small workpieces are to be machined in a short time. The function of the robot is also simplified. All of these advantages result in reduced costs. Furthermore, since the workpieces are stacked while guided and supported by guide bars, the stacked workpieces are stable and accurately aligned. This enables the workpieces to be transferred to and from the robot precisely and reliably.

We claim:

1. Apparatus for transferring a workpiece to and from a robot comprising:

a plurality of guide bars, and feeder means for moving the guide bars along a generally horizontal transfer path, the guide bars being vertical and parallel to one another in transverse relation to the transfer path, and arranged at a uniform pitch along the transfer path;

a workpiece carrier on each guide bar, the workpiece carrier being adapted to support a stack of workpieces, and being arranged to be guided for vertical movement by its guide bar;

a pair of elevator means, and means for supporting and guiding the elevator means for movement in parallel with the transfer path;

means for selectably engaging and disengaging the pair of elevator means with and from the feeder means, whereby the elevator means can be made to move together with the guide bars in the direction of the transfer path, and can also be made to allow movement of the guide bars without movement of the elevator means;

engagement-separation means carried by one elevator means of said pair for engaging and disengaging one of a pair of adjacent workpiece carriers and elevating the same when engaged;

engagement-separation means carried by the other elevator means of said pair for engaging and disengaging the other of said pair of adjacent workpiece carriers and elevating the same when engaged;

detection means for sensing and producing a signal when the workpiece stack on a workpiece carrier for workpieces to be machined reaches a predetermined level and for sensing and producing a signal when the workpiece stack on an adjacent workpiece carrier for receiving machined workpieces reaches a predetermined level;

elevation control means for causing each elevator means of said pair to move the workpiece stack on a corresponding workpiece carrier to its predetermined level in response to a signal from said detection means when the workpiece carrier is at a prescribed position in said transfer path; and sequence controlling means for causing a predetermined number of alternate forward and backward movements of the feeder means through a distance corresponding to the distance between guide bars, and thereafter causing the engagement-separation means to disengage the workpiece carriers on the guide bars and then causing the feeder means to move backwardly through twice the distance between adjacent guide bars;

said elevator control means causing, for each pair of movements consisting of one forward movement followed by one backward movement in said predetermined number, an ascending movement of one elevator of said pair substantially limited to the height of one workpiece to be machined and a descending movement of the other elevator of said pair substantially limited to the height of one machined workpiece.

whereby a robot served by the transferring apparatus can transfer all of a group of workpieces stacked on a first workpiece carrier to a machine tool and thence to a second workpiece carrier adjacent to the first workpiece carrier, and then proceed to transfer all of a group of workpieces stacked on a third workpiece carrier adjacent to the first workpiece carrier, to the machine tool and thence to the first workpiece carrier.

2. Apparatus according to claim 1 in which the detection means comprises a first detector for sensing the position of the workpieces to be machined and a second detector for sensing the position of the workpiece carrier for receiving machined workpieces.

3. Apparatus for transferring a workpiece to and from a robot comprising:
a plurality of guide bars, and feeder means for moving the guide bars along a generally horizontal transfer path, the guide bars being vertical and parallel to one another in trasverse relation to the transfer path, and arranged at a uniform pitch along the transfer path;
a workpiece carrier on each guide bar, the workpiece carrier being adapted to support a stack of workpieces, and being arranged to be guided for vertical movement by its guide bar;
a pair of elevator means, and means for supporting and guiding the elevator means for movement in parallel with the transfer path;
means for selectably engaging and disengaging the pair of elevator means with and from the feeder means, whereby the elevator means can be made to move together with the guide bars in the direction of the transfer path, and can also be made to allow movement of the guide bars without movement of the elevator means;
engagement-separation means carried by one elevator means of said pair for engaging and disengaging one of a pair of adjacent workpiece carriers and elevating the same when engaged;
engagement-separation means carried by the other elevator means of said pair for engaging and disengaging the other of said pair of adjacent workpiece carriers and elevating the same when engaged;
detection means for sensing and producing a signal when the workpiece stack on a workpiece carrier for workpieces to be machined reaches a predetermined level and for sensing and producing a signal when the workpiece stack on an adjacent workpiece carrier for receiving machined workpieces reaches a predetermined level;

elevation control means for causing each elevator means of said pair to move the workpiece stack on a corresponding workpiece carrier to its predetermined level in response to a signal from said detection means when the workpiece carrier is at a prescribed position in said transfer path; and sequence controlling means for causing a predetermined number of alternate forward and backward movements of the feeder means through a distance corresponding to the distance between guide bars, and thereafter causing the engagement-separation means to disengage the workpiece carriers on the guide bars and then causing the feeder means to move backwardly through twice the distance between adjacent guide bars;

whereby a robot served by the transferring apparatus can transfer all of a group of workpieces stacked on a first workpiece carrier to a machine tool and thence to a second workpiece carrier adjacent to the first workpiece carrier, and then proceed to transfer all of a group of workpieces stacked on a third workpiece carrier adjacent to the first workpiece carrier, to the machine tool and thence to the first workpiece carrier;

in which the pair of elevator means are supported on a tiltable support means and in which said means for selectably engaging and disengaging the pair of elevator means with and from the feeder means effects disengagement by tilting said tiltable support means.

4. Apparatus for transferring a workpiece to and from a robot comprising:
a plurality of guide bars, and feeder means for moving the guide bars along a generally horizontal transfer path, the guide bars being vertical and parallel to one another in transverse relation to the transfer path, and arranged at a uniform pitch along the transfer path;
a workpiece carrier on each guide bar, the workpiece carrier being adapted to support a stack of workpieces, and being arranged to be guided for vertical movement by its guide bar;
a pair of elevator means, and means for supporting and guiding the elevator means for movement in parallel with the transfer path;
means for selectably engaging and disengaging the pair of elevator means with and from the feeder means, whereby the elevator means with and from the feeder means, whereby the elevator means can be made to move together with the guide bars in the direction of the transfer path, and can also be made to allow movement of the guide bars without movement of the elevator means;
engagement-separation means carried by one elevator means of said pair for engaging and disengaging one of a pair of adjacent workpiece carriers and elevating the same when engaged;
engagement-separation means carried by the other elevator means of said pair for engaging and disengaging the other of said pair of adjacent workpiece carriers and elevating the same when engaged;
detection means for sensing and producing a signal when the workpiece stack on a workpiece carrier for workpieces to be machined reaches a predetermined level and for sensing and producing a signal when the workpiece stack on an adjacent workpiece carrier for receiving machined workpieces reaches a predetermined level;

elevation control means for causing each elevator means of said pair to move the workpiece stack on a corresponding workpiece carrier to its predetermined level in response to a signal from said detection means when the workpiece carrier is at a prescribed position in said transfer path; and sequence controlling means for causing a predetermined number of alternate forward and backward movements of the feeder means through a distance corresponding to the distance between guide bars, and thereafter causing the engagement-separation means to disengage the workpiece carriers on the guide bars and then causing the feeder means to move backwardly through twice the distance between adjacent guide bars;

whereby a robot served by the transferring apparatus can transfer all of a group of workpieces stacked on a first workpiece carrier to a machine tool and thence to a second workpiece carrier adjacent to the first workpiece carrier, and then proceed to transfer all of a group of workpieces stacked on a third workpiece carrier adjacent to the first workpiece carrier, to the machine tool and thence to the first workpiece carrier;

in which the pair of elevator means are supported on a tiltable support means and in which said means for selectably engaging and disengaging the pair of elevator means with and from the feeder means effects disengagement by tilting and tiltable support means; and in which said means for selectably engaging and disengaging the pair of elevator means with and from the feeder means comprises a series of engagement pieces disposed along, and movable with, the feeder means along the transfer path, and a pair of engagement-separation elements carried with the elvator means, one of the pair of engagement-separation elements being engageable with one of said engagement pieces in said series on the foremost side thereof in one direction of feeder travel and the other of said pair of engagement-separation elements being engageable with the other of said engagement pieces on the rearmost side thereof in said one direction of feeder travel, whereby movement of the elevator means follows movement of the feeder means in both directions when the elevator means and feeder means are engaged.

5. Apparatus for transferring a workpiece to and from a robot comprising:

a plurality of guide bars, and feeder means for moving the guide bars along a generally horizontal transfer path, the guide bars being vertical and parallel to one another in transverse relation to the transfer path, and arranged at a uniform pitch along the transfer path;

a workpiece carrier on each guide bar, the workpiece carrier being adapted to support a stack of workpieces, and being arranged to be guided for vertical movement by its guide bar;

a pair of elevator means, and means for supporting and guiding the elevator means for movement in parallel with the transfer path;

means for selectably engaging and disengaging the pair of elevator means with and from the feeder means, whereby the elevator means can be made to move together with the guide bars in the direction of the transfer path, and can also be made to allow movement of the guide bars without movement of the elevator means;

engagement-separation means carried by one elevator means of said pair for engaging and disengaging one of a pair of adjacent workpiece carriers and elevating the same when engaged;

engagement-separation means carried by the other elevator means of said pair for engaging and disengaging the other of said pair of adjacent workpiece carriers and elevating the same when engaged;

detection means for sensing and producing a signal when the workpiece stack on a workpiece carrier for workpieces to be machined reaches a predetermined level and for sensing and producing a signal when the workpiece stack on an adjacent workpiece carrier for receiving machined workpieces reaches a predetermined level;

elevation control means for causing each elevator means of said pair to move the workpiece stack on a corresponding workpiece carrier to its predetermined level in response to a signal from said detection means when the workpiece carrier it at a prescribed position in said transfer path; and sequence controlling means for causing a predetermined number of alternate forward and backward movements of the feeder means through a distance corresponding to the distance between guide bars, and thereafter causing the engagement-separation means to disengage the workpiece carriers on the guide bars and then causing the feeder means to move backwardly through twice the distance between adjacent guide bars;

whereby a robot served by the transferring apparatus can transfer all of a group of workpieces stacked on a first workpiece carrier to a machine tool and thence to a second workpiece carrier adjacent to the first workpiece carrier, and then proceed to transfer all of a group of workpieces stacked on a third workpiece carrier adjacent to the first workpiece carrier, to the machine tool and thence to the first workpiece carrier;

in which at least part of the transfer path including said prescribed position is in the form of a circular arc, and the means for supporting and guiding the elevator means comprises an arm pivoted for horizontal swinging movement about an axis coinciding with the center of said arc.

* * * * *